Figure 1:
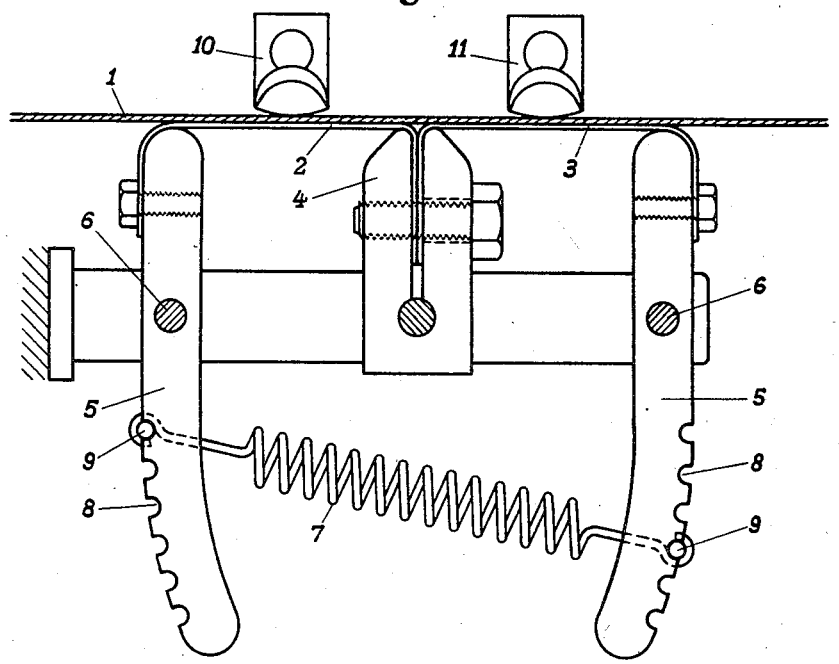

Jan. 9, 1951 A. MOESSINGER 2,537,476
THREAD BRAKE
Filed Oct. 9, 1947 3 Sheets-Sheet 1

INVENTOR.
ALBERT MOESSINGER
BY K. A. Mayr
ATTORNEY

Jan. 9, 1951 — A. MOESSINGER — 2,537,476
THREAD BRAKE
Filed Oct. 9, 1947 — 3 Sheets-Sheet 2

INVENTOR.
ALBERT MOESSINGER
BY K. A. Mayr
ATTORNEY

Jan. 9, 1951  A. MOESSINGER  2,537,476

THREAD BRAKE

Filed Oct. 9, 1947  3 Sheets-Sheet 3

INVENTOR.
ALBERT MOESSINGER.
BY
K. A. Mayr.
ATTORNEY.

Patented Jan. 9, 1951

2,537,476

UNITED STATES PATENT OFFICE 2,537,476

THREAD BRAKE

Albert Moessinger, Winterthur, Switzerland, assignor to Sulzer Frères, Société Anonyme, Winterthur, Switzerland Application October 9, 1947, Serial No. 778,847
In Switzerland October 10, 1946

21 Claims. (Cl. 242—156)

Known thread brakes have two rigid plates, between which the thread runs; they are made of hardened steel, porcelain, glass, etc. At each irregularity or at each knot in the thread, the loaded part of the brake must move. When the thread is moving at a high speed, this lifting of the brake plate requires a considerable accelerating force, which is to be produced by the thread itself. These forces are greater, the more obtuse the inlet angle of the brake member. They have the disadvantage that, for producing the necessary accelerating force for raising the loaded brake plate, the thread tension increases to such an extent that the thread will generally break. This drawback is not the result of the choice of a hard material, but because the known thread brakes consist of rigid plates having great mass.

The invention eliminates this drawback by the provision of a flexible member which is tensioned and thereby given a special shape, which yields under pressure, although the member is formed of material which is in itself hard. The member is thin and has comparatively little mass. It therefore needs considerably less accelerating force than corresponding members in conventional brakes and the danger of the thread being broken is considerably diminished.

Figure 2:
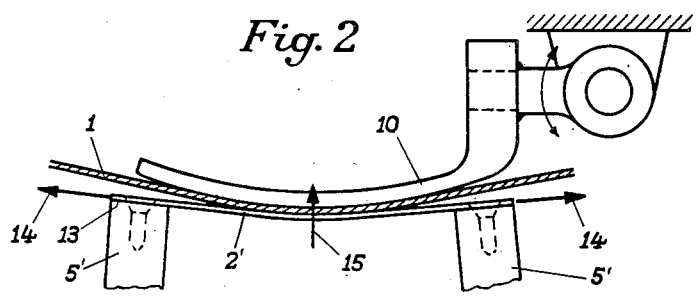
Figure 3:
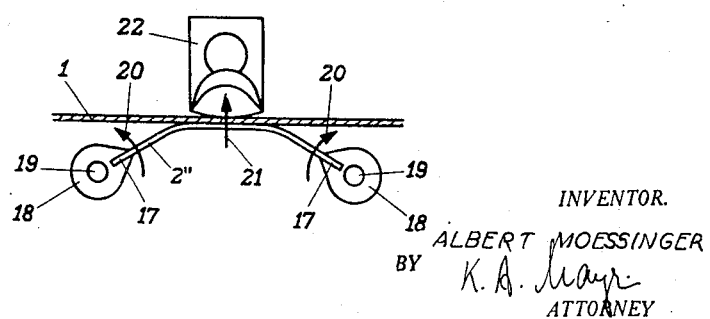
Figure 4:
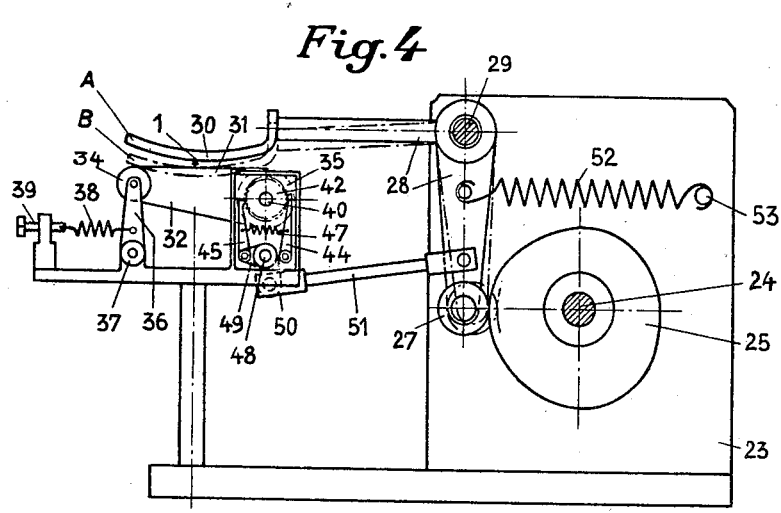
Figure 5:
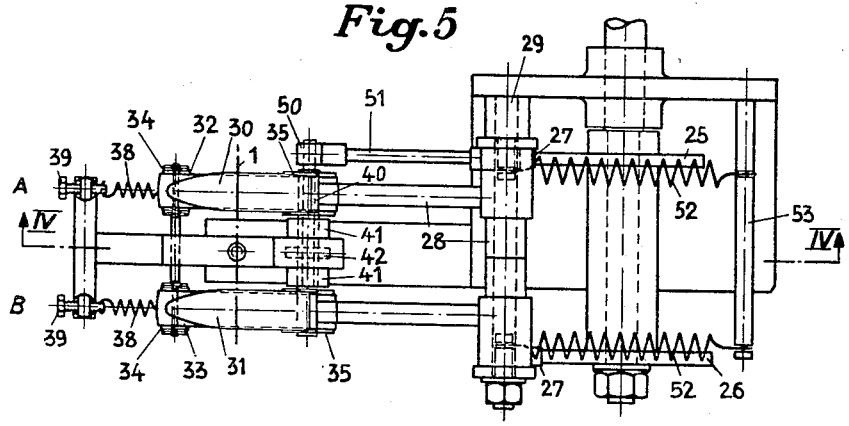
Figure 6:
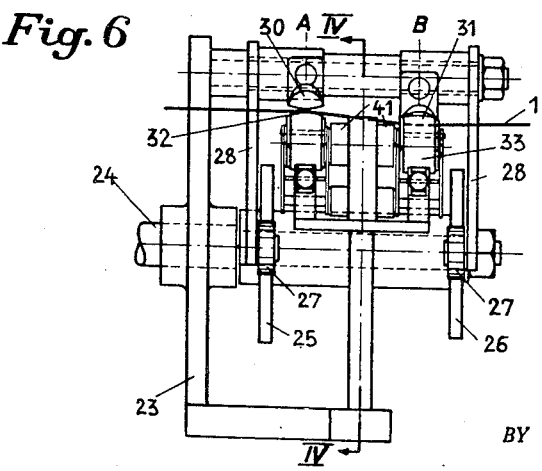
Figure 7:
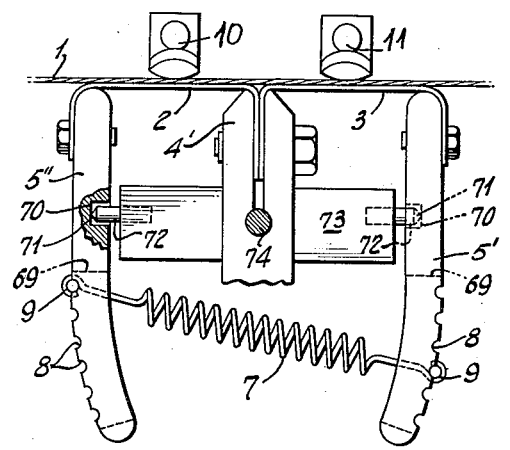
Figure 8:
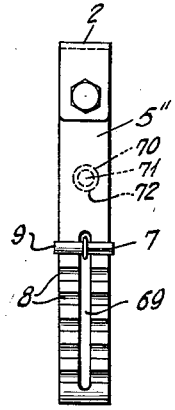
Figure 9:
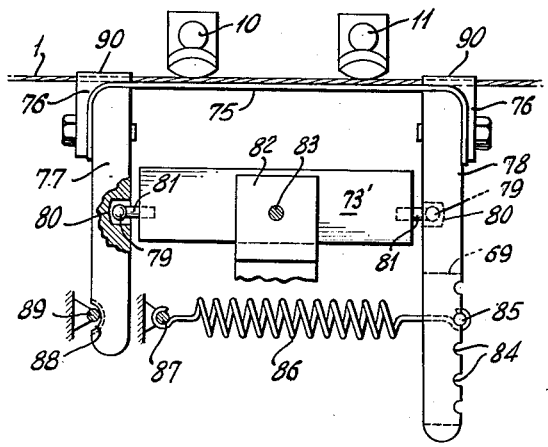
Figure 10:
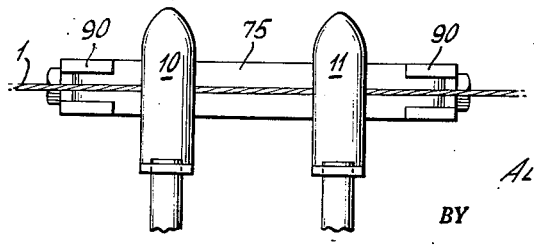

In the drawing three embodiments of the invention are illustrated diagrammatically:

Fig. 1 shows a double thread brake having a brake member made of steel strip,

Fig. 2 illustrates the fixing of the strip for being held taut by tensile forces, Fig. 3 shows an arrangement in which a bending moment is produced at the end of the strip, Fig. 4 shows a double thread brake with steel strips kept taut by rollers, Fig. 5 is a plan view of the mechanism shown in Fig. 4, Fig. 6 is a front view of the brake shown in Fig. 4, Fig. 7 is a side view of two brakes fitted in series, Fig. 8 is an end view of a part of the system shown in Fig. 7, Figs. 9 and 10 are a side view and a top view, respectively, of two brakes having one common braking member, yielding and held taut.

The thread brake according to Figure 1 which serves, for instance, for braking the weft thread 1 of a loom, not illustrated, consists of metal strips 2 and 3 which, if made of steel, may be hardened or unhardened. One end of the strips 2 and 3 is firmly held by a clamp 4 and the other ends of the strips 2 and 3 are fixed to the upper end of two-armed levers 5. The latter swing on pins 6 which are fixed on the frame of the textile machine. The strips 2 and 3 are held taut by a tension spring 7. The lower ends of levers 5 are provided with notches 8 serving to hold the pins 9 to which the tension spring 7 is connected. The tension of spring 7 depends on the choice of the notches into which the pins 9 are inserted.

The pressing members, or rigid brake members 10 and 11, press the thread 1 against the strips 2 and 3, the braking force however being produced by the tension of the strips 2 and 3 and depending on the position of these pressing members relative thereto. The braking members 10 and 11 are placed between the two fixed portions of the strips 2 and 3, which can be bent freely downwards in the region of the brake members 10 and 11.

The braking force depends on the method of fixing and on the shape given to the two strips 2 and 3. If the two strips 2 and 3 are already bent at right angles at their ends to correspond with the fixing in Figure 1, only slight bending moments will occur in them when bent downwards. It will be otherwise if the strips 2 and 3 are unbent before their ends are inserted into the thread brake. In this case, bending moments occur as illustrated in Fig. 2.

In order that the strips 2 and 3 may be subjected to tensile forces only, perfectly straight strips 2 must be placed on the top face 13 of the levers 5, as illustrated in Figure 2. The levers 5 of the system according to Figure 2 also turn on pins 6 and are loaded by a spring 7 as in Figure 1. The tension forces 14 occurring in the strip 2, Figure 2, determine the size of the braking force indicated by arrow 15, when the brake member 10 presses the thread 1 down on the strip 2.

If the braking force is to be effected by bending moments or torques produced on the ends of the strips, these ends 17, as shown in Figure 3, may be inserted in a cut made in a roller-shaped holder 18. The roller 18 turns on a pin 19, corresponding to the pins 6 of the lever 5, which are connected to the frame of the textile machine. The rollers 18 are turned by a tension spring or by some other means in the direction of the arrow 20, which produces bending moments in the strip 2'' and produces a braking force indicated by arrow 21 in cooperation with the pressing member 22 shown on the drawing.

The two thread brakes A and B in Figs. 4 to 6 are arranged in series with respect to the thread 1. In casing 23 a shaft 24 with cams 25 and 26 is rotatably arranged. Cams 25 and 26 cooperate with cam follower rollers 27 at the ends of bellcrank levers 28 which are swingably supported by shaft 29 and control the brake members 30 and 31. This mechanism is disclosed in applicant's co-pending application Ser. No. 602,074, filed June 28, 1945.

The brake members 30 and 31 press the thread 1 on the two endless strips 32 and 33, each of which passes over two rollers 34 and 35. These strips 32 and 33 consist of metal, for instance hardened steel, which by being given a suitable shape, may be made very thin and therefore yielding. The rollers 34 are pivotably carried in levers 36, which swing about pin 37 and are drawn to the left by springs 38, whose tension may be adjusted by means of screws 39, in order to keep the strips 32 and 33 taut.

The rollers 35 are firmly keyed on shaft 40 which is supported by a stationary bearing 41. In addition, a ratchet wheel 42 is keyed on the shaft 40. This ratchet wheel 42 may be intermittently rotated by pawl levers 44 and 45 which are drawn together by a spring 47. The pawl lever 45 is carried rotatably on a lever 49 keyed on a shaft 48. On the same shaft 48 a further lever arm 50 is keyed, which is connected by rod 51 to one of the bellcrank levers 28, so that lever 50 is moved reciprocatingly and pawl 45 imparts an intermittent motion to the rollers 35, rotating them slowly. Pawl 44 prevents the ratchet wheel 42 from moving backwards. By this small movement of rotation, the endless strips 32 and 33, which are kept taut, receive a forward movement whose direction is inclined to the direction of the thread.

Levers 28 are drawn by springs 52 against the cams 25 and 26, the springs 52 having such a tension that the rollers 27 of the levers 28 are always pressed against the cams 25 and 26, respectively. The springs 52 are fixed to the casing 23 by means of a pin 53.

The device operates as follows:

The weft thread 1 is pressed by the brake members 30 and 31 against the strips 32 and 33 and is thus braked. The brake is controlled by cams 25 and 26. When the shaft 24 rotates with the cams 25 and 26, the brake members 30 and 31 can be raised from the strips 32 and 33 so far that the respective brake, A or B, no longer acts on the weft thread 1. In the intermediate positions of the brake members 30 and 31 a reduced braking effect is obtained.

The cams 25 and 26 may have the same shape; one of the cams may be so displaced with respect to the other, that the brakes A and B are operated at different times. In Figures 4-6 the brake A is raised and the brake B acts on the weft thread 1. The shaft 24 may be connected to the driving shaft of a loom, for instance in such a way that the cams make one or several complete revolutions during one pick, i. e. between the insertion of one weft thread and the insertion of the next weft thread, so that the brakes A and B are operated alternately and in timed relation with the operation of the loom.

The springs 38 may be adjusted by means of the set screws 39 so that the tension of the two strips 32 and 33 produces a braking force, suitable for the shuttle speed and also for the material and for the thickness of the weft thread. In gripper looms in which the weft thread is drawn intermittently through the loom, it is very advantageous if the braking force acting on the weft thread is altered temporarily.

The provision of a member which is yielding because of its configuration has the advantage of applying a uniform braking force to the thread and of automatically adjusting the thread braking effect. The greater the thickness of the thread, the greater will be the angle made by the tensioned strip around the thread. In addition to the greater friction caused by this greater angle, the angle exerts on the thread a greater resultant force, so that the braking force is greater. The braking force thus adjusts itself to the size of the thread.

The soft strip shaped body may be arranged parallel to the thread which has to be braked. To accomplish this, the device shown in Figs. 4 to 6 would have to be turned by 90° and brake members 30 and 31 would have to be fixed at a right angle to the horizontal arm of the lever 28 as compared with the position shown in Fig. 5. This arrangement reduces the danger of breaking threads particularly if they have thick parts or individual knots.

If the thread to be braked moves transversely to the soft strip-shaped member, the rollers 34 and 35 may be made barrel-shaped, so that the strip-shaped element is bent transverse to the strip, and the edges of the strip do not touch the thread.

In Fig. 7 the thread is braked by rigid braking members or press-on members 10 and 11 by pressing it against two taut yielding strip-shaped braking members 2 and 3. One end of the brake strips 2 and 3 is held by a clamp 4', which is rigidly connected to the frame of the machine. The other ends of the brake strips 2 and 3 are fixed to tensioning members 5'' and 5', respectively, i. e. each end is connected to the upper arm of a two-armed lever. The levers 5'' and 5' are each provided with a cavity 70, and are pivoted on the pointed ends 71 of pins 72 at the ends of a carrier member 73. Because of this method of supporting, the tensioning members 5'' and 5' can move about two or more axes and, in fact they can rotate a little about their longitudinal axis and about axes which are at right angles to the longitudinal axis. The rotating about the last-named axis is necessary for the bending and tensioning of the brake strips 2 and 3. By turning about the axis of pins 72, a slightly oblique position of the brake strips 2 and 3 is obtained fitting them to the brake surface of the pressing-on members 10 and 11. The pins 72 are inserted in the carrier 73, which is rigidly connected by means of the pins 74 to the clamp 4' and thereby to the frame.

For loading the tensioning members 5'', a tension spring 7 is provided, which, by means of bolts 9, can be inserted into notches 8 on the lower arm of the tensioning members 5'' and 5' in order to regulate the tension.

Figure 8 shows the construction of the tensioning members, the end of spring 7 extending through a slot 69. The pin 9 is passed through the eye at the end of the spring 7. In this manner the middle of the yielding brake members 2 and 3, the fulcrums 71, and the eyes at the ends of the spring 7 are in a plane, so that the yielding brake strip 2, 3 or 75 of the device shown in Fig. 9 is uniformly tensioned.

In the embodiment of the invention shown in Figs. 9 and 10 a brake strip 75 common to the rigid brake members 10 and 11 is fixed by means of clamping pieces 76 to the upper end of double levers 77 and 78, which are movably supported on ball-shaped ends 79 of pins 81 which extend into cavities 80 provided on levers 77 and 78. The pins 81 are inserted in the carrier 73', which is connected by means of a pin 83 to a supporting arm 82 connected to the machine frame. The tensioning member 78 is provided on its lower end with notches 84 which serve, as in Figs. 1 and 7, for altering the tension of the braking member 75. In these notches bolt 85 connected to the right end of tension spring 86 can be selectively inserted. The left end of spring 86 is hooked to pin 87 which is fixed to the machine frame. The tensioning member 78 can consequently move freely round its longitudinal axis as well as about several axes extending through the ball 79 and transverse to the member 78.

The tensioning member 77 has a notch 88 on its lower arm which is pressed against an abutment 89, which permits limited movability of the tensioning member about its longitudinal axis and about the axis of the pin 81, whilst movement transverse to this axis, namely in the plane of the drawing, in the sense of loosening the braking strip, is prevented.

If both or only one of the rigid braking bodies 10 and 11 do not press flat on the braking strips 2 and 3, or 75, they will nevertheless surround the thread 1 uniformly because of the support of the two-armed levers 5' and 5'', or 77 and 78, on the points 71 and on the ball 79, respectively, so that the thread 1 is correctly braked, even when the rigid braking parts 10 and 11 are inclined or not pressing correctly. On both sides of the thread 1 the clamping pieces 76 are provided with guides 90 preventing the thread from sliding off the braking strip 75. These guides reach over the whole upper end of the tension members 77, 78 and have therefore the effect that the free part of the braking strip 75 does not bulge upwards but remains flat. This has the advantage that the pressing members 10 and 11 must be raised only a little in order to free the thread.

Through the invention the advantage is obtained that the taut yielding member can yield not only in one direction but in several directions. When the rigid braking member cooperating with the yielding braking member takes up an inclined position with respect to the plane of the latter, the yielding member can adapt itself to the rigid member. If the yielding member is in the form of a strip, and one side expands more than the other, the tensioning member can turn about its longitudinal axis. The thread is consequently properly braked in all positions of the brake.

I claim:

1. A thread brake comprising a flexible member having marginal portions, a brake shoe movable substantially at a right angle to and from said member between said marginal portions, and stretching and supporting means rigidly connected with said marginal portions and holding said member in stretched condition.

2. A thread brake comprising a flexible member having two ends, a brake shoe movable at a substantially right angle to and from said flexible member, two individually swingably supported post members individual having end portions to which the ends of said flexible member are individually connected, and resilient means connected with said post members for forcing said end portions apart and thereby stretching said flexible member.

3. A thread brake as defined in claim 2, said flexible member consisting of a strip having a hard surface facing said brake shoe.

4. A thread brake as defined in claim 2, said flexible member consisting of a metal strip.

5. A thread brake as defined in claim 2, said flexible member extending longitudinally substantially parallel to the thread to be braked.

6. A thread brake as defined in claim 2, said flexible member extending longitudinally substantially parallel to the thread to be braked and said brake shoe having a longitudinal extension disposed substantially transversely to said thread.

7. A thread brake as defined in claim 2, said flexible member extending longitudinally substantially parallel to the thread to be braked and said brake shoe having a longitudinal extension disposed substantially parallel to said thread.

8. A thread brake comprising a flexible member having two ends, a brake shoe movable to and from said member, two levers individually having end portions to which the ends of said flexible member are individually connected, a carrier member having two ends individually swingably connected with said levers and forming the fulcrums thereof, and resilient means interconnecting said levers and forcing apart their end portions to which said flexible member is connected and thereby stretching it.

9. A thread brake as set forth in claim 8, the ends of said carrier member being pivoted to said levers.

10. A thread brake as set forth in claim 8, said levers having recesses and said carrier member having pins at its ends individually abutting said levers in said recesses.

11. A thread brake comprising a flexible member having two ends, a brake shoe movable to and from said member, two two-arm levers, each lever having an arm connected with one end of said flexible member, a carrier member swingably connected with said levers at their fulcrums and holding same apart, each of said levers having another arm, resilient means interconnecting said other arms and pulling same together and forcing the arms to which said flexible member is connected apart and thereby tensioning it.

12. A thread brake as defined in claim 11, said resilient means having ends individually connected with said other arms at individually adjustable distances from the fulcrums of said levers.

13. A thread brake comprising a flexible member, a brake shoe movable to and from said member, two two-arm levers each having an arm connected with said flexible member, a carrier member swingably connected with said levers at their fulcrums and holding same apart, each of said levers having another arm, recesses in the distal sides of said other arms at different distances from the fulcrums of the levers to which the arms pertain, and a tensioning member having end portions selectively engageable in said recesses and pulling said other arms together and the arms to which said flexible member is connected, apart and tensioning the flexible member with a force depending on the selection of said recesses.

14. A thread brake comprising two post members individually having end portions, a carrier member swingably supporting and spacing said post members, a support extending from said carrier member between said end portions, flexible means connected with said end portions and with said support, tensioning means connected with said post members and forcing their end portions apart and thereby tensioning said flexible means, and a brake shoe movable to and from said flexible means between one of said end portions and said support.

15. A thread brake comprising two flexible longitudinal members disposed in a line and each having two ends, two of said ends being adjacent, a support connected to said adjacent ends, two swingably supported post members individually having portions individually connected with the other ends of said flexible members, tensioning means connected with said post members and forcing apart their portions which are connected with said flexible members and thereby tensioning same, and a brake shoe disposed between said support and each of said post members and being movable to and from said flexible member.

16. A thread brake comprising a flexible member, a brake shoe movable to and from said member, a support connected with said flexible member, a swingably supported member having a portion connected with said flexible member, a stationary support, and resilient means having an end connected with said stationary support and having another end connected with said swingably supported member and pulling the portion thereof which is connected with said flexible member away from said first support and stretching said flexible member.

17. A thread brake comprising a flexible member, a brake shoe movable to and from said flexible member, a support connected with said flexible member, a swingably supported two-arm lever having one arm connected with said flexible member, a stationary support, and resilient means having one end connected with said stationary support and another end connectable to the other arm of said lever at various distances from the fulcrum thereof and pulling the first arm of said lever away from said first support and stretching said flexible member with a force depending on the distance from the fulcrum of the lever at which said resilient means is connected with said other arm.

18. A thread brake comprising a flexible member having two ends, a brake shoe movable to and from said member, and a lever system comprising two levers individually having end portions to which the ends of said flexible member are individually connected, a carrier member having two ends individually swingably connected with said levers, and resilient means connected with one lever and forcing apart the end portions of said levers to which said flexible member is connected and thereby stretching it.

19. A thread brake comprising a flexible member having two ends, a brake shoe movable to and from said member, two levers individually having end portions to which the ends of said flexible member are individually connected, a carrier member having two ends individually movably connected with said levers and forming the fulcrum of one of said levers, and resilient means connected with said last mentioned lever and forcing apart the end portions of said levers to which said flexible member is connected and thereby stretching it.

20. A thread brake comprising a flexible member having two ends, a brake shoe movable to and from said member, two levers individually connected with the ends of said flexible member, a spacer member having two ends individually movably connected with said levers, a fixed fulcrum abutting one of said levers, a fixed support, and resilient means connected with the other lever and with said fixed support, the relation of the parts being such that the resilient means forces said levers to positions where said flexible member is stretched.

21. A thread brake as defined in claim 20, the lever abutting said fixed fulcrum having a recess at the point of abutment larger than the fulcrum to afford longitudinal movement of the lever, the ends of said spacer member being ball shaped, and said levers having recesses receiving said ball shaped ends to afford swinging of said levers at said ends about two different axes.

ALBERT MOESSINGER.

REFERENCES CITED

The following references are of record in the file of this patent:

UNITED STATES PATENTS

| Number | Name | Date |
|---|---|---|
| 1,240,045 | Hammond-Knowlton | Sept. 11, 1917 |
| 1,752,195 | Palin | Mar. 25, 1930 |
| 2,124,001 | Lawson et al. | July 19, 1938 |
| 2,405,885 | Gwaltney et al. | Aug. 13, 1946 |
| 2,417,818 | Fuin | Mar. 25, 1947 |